(12) United States Patent
Sankman et al.

(10) Patent No.: US 9,374,162 B2
(45) Date of Patent: Jun. 21, 2016

(54) SEMICONDUCTOR PACKAGE WITH OPTICAL PORT

(71) Applicant: Intel Corporation, Santa Clara, CA (US)

(72) Inventors: Robert L. Sankman, Phoenix, AZ (US); Johanna M. Swan, Scottsdale, AZ (US); Dmitri E. Nikonov, Beaverton, OR (US); Raseong Kim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 13/719,884

(22) Filed: Dec. 19, 2012

(65) Prior Publication Data
US 2014/0169801 A1    Jun. 19, 2014

(51) Int. Cl.
G02B 6/42 (2006.01)
H04B 10/25 (2013.01)
G02B 6/43 (2006.01)
H04B 10/80 (2013.01)

(52) U.S. Cl.
CPC .............. *H04B 10/2504* (2013.01); *G02B 6/43* (2013.01); *H04B 10/801* (2013.01)

(58) Field of Classification Search
None
See application file for complete search history.

(56) References Cited

U.S. PATENT DOCUMENTS

| | | | | |
|---|---|---|---|---|
| 5,200,631 A * | 4/1993 | Austin et al. | | 257/570 |
| 6,181,865 B1 * | 1/2001 | Saviano | | 385/139 |
| 6,624,444 B1 * | 9/2003 | Li | | H01L 31/12 257/59 |
| 6,633,998 B1 * | 10/2003 | Lau | | 714/22 |
| 6,715,018 B2 * | 3/2004 | Farnworth et al. | | 710/300 |
| 7,418,163 B2 * | 8/2008 | Chakravorty et al. | | 385/14 |
| 7,532,785 B1 * | 5/2009 | Beausoleil et al. | | 385/14 |
| 2004/0033008 A1 * | 2/2004 | Mikawa et al. | | 385/14 |
| 2004/0206988 A1 * | 10/2004 | Glebov | | G02B 6/13 257/244 |
| 2005/0224946 A1 * | 10/2005 | Dutta | | 257/686 |
| 2005/0276604 A1 * | 12/2005 | Morrow et al. | | 398/73 |
| 2008/0124025 A1 * | 5/2008 | Bozso et al. | | 385/31 |
| 2009/0097851 A1 * | 4/2009 | Tan et al. | | 398/82 |
| 2009/0103855 A1 * | 4/2009 | Binkert et al. | | 385/14 |
| 2009/0226130 A1 * | 9/2009 | Doany et al. | | 385/14 |
| 2010/0266276 A1 * | 10/2010 | Zheng et al. | | 398/43 |
| 2012/0170887 A1 * | 7/2012 | Yang | | G02B 6/132 385/14 |
| 2012/0177381 A1 * | 7/2012 | Dobbelaere | | H01L 21/84 398/139 |
| 2014/0025859 A1 * | 1/2014 | Krause | | 710/308 |

* cited by examiner

*Primary Examiner* — Mike Stahl
(74) *Attorney, Agent, or Firm* — Forefront IP Lawgroup, PLLC

(57) ABSTRACT

Described herein are technologies related to a semiconductor package that is installed in a portable device for data communications. More particularly, the semiconductor package that contains a memory, a digital logic chip, and an optical port in a single module or mold is described.

23 Claims, 5 Drawing Sheets

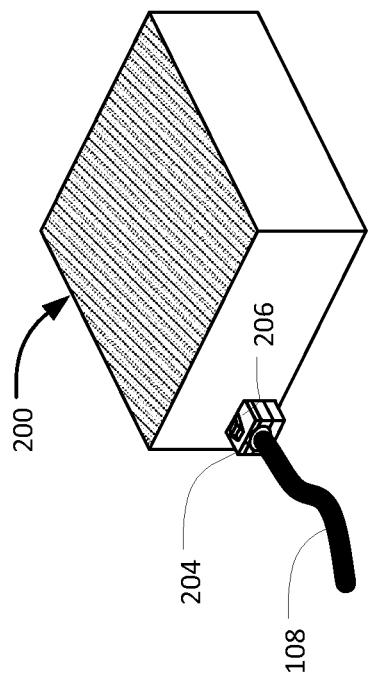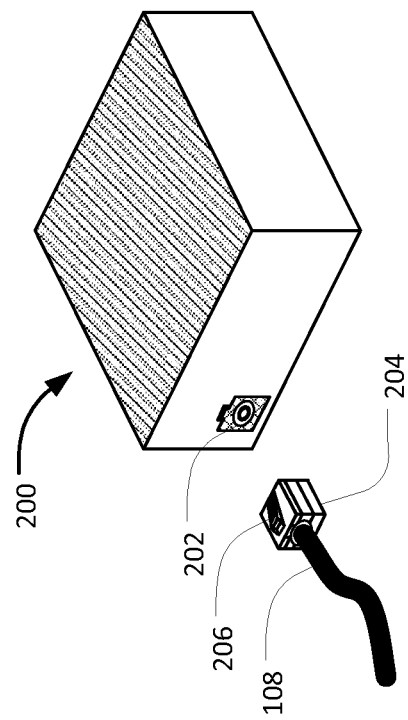
FIG. 2a
FIG. 2b

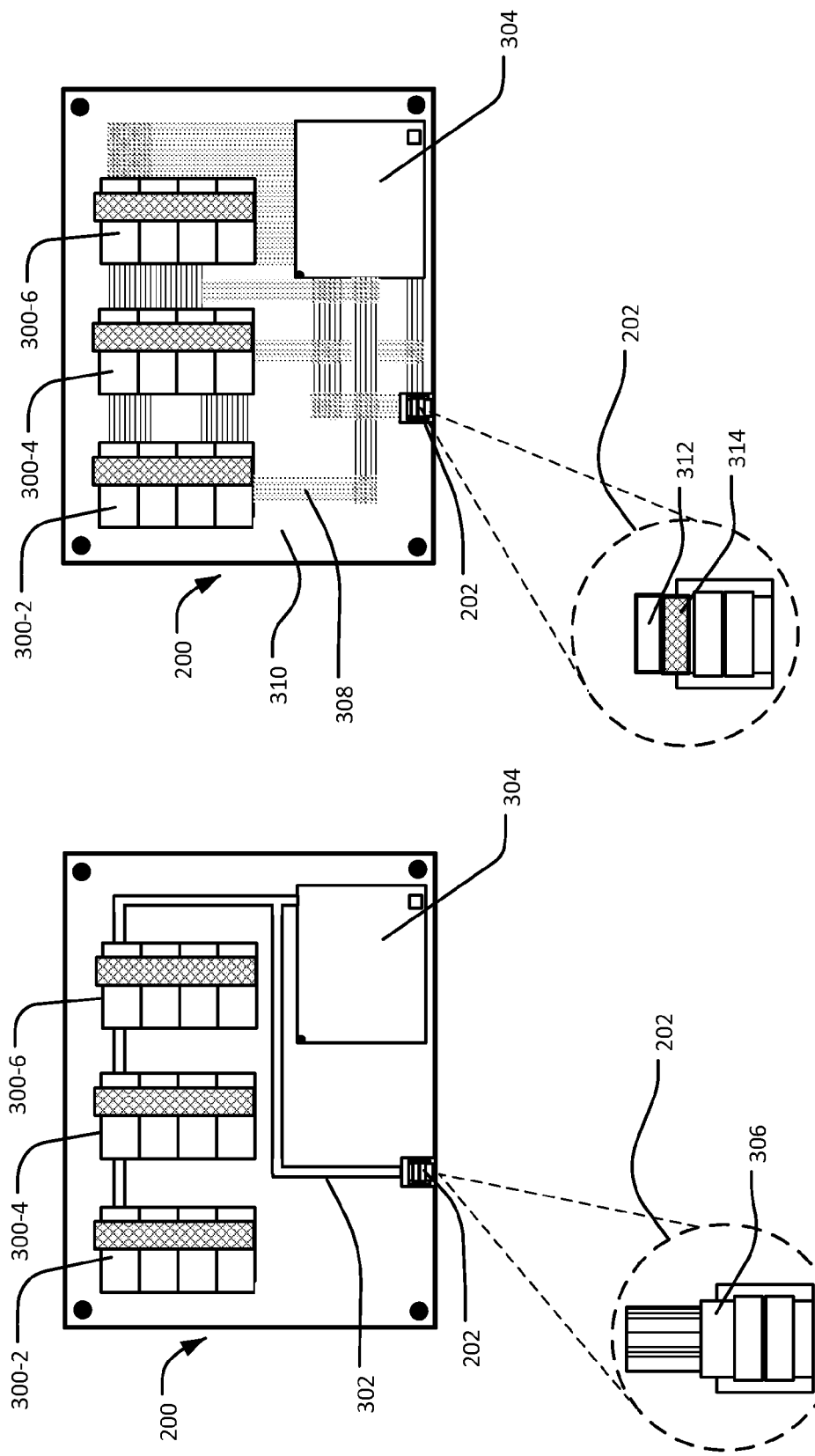

SEMICONDUCTOR PACKAGE WITH OPTICAL PORT

BACKGROUND

Fiber-optic communication is a method of transmitting information from one place to another by sending pulses of light signals through an optical fiber cable. The light signals form an electromagnetic carrier wave modulated by the information to be transmitted over the optical fiber cable. Fiber-optic communication has revolutionized the telecommunications industry due to its advantages over electrical transmission. For example, optical fiber cables have largely replaced copper wire communications in core networks. In this example, large data transmission utilizes the fiber-optic communication due to its capacity and tolerance to noise or distortion during data communication.

A process of transmitting information through the optical fiber cable may involve the following basic steps: first, creating the light signal through the use of a transmitter; second, relaying the light signal along the optical fiber cable; third, ensuring that the light signal does not become distorted or weak; and fourth, receiving the light signal and converting it into an electrical signal.

BRIEF DESCRIPTION OF THE DRAWINGS

FIG. 2a illustrates a semiconductor package with a disconnected fiber optic cable.

FIG. 2b illustrates a semiconductor package with a connected fiber optic cable.

FIG. 3a illustrates a semiconductor package that utilizes an electro-optical coupler to interconnect components within the semiconductor package.

FIG. 3b illustrates a semiconductor package that utilizes a conductive wiring of a printed circuit board (PCB) to interconnect components within the semiconductor package.

DETAILED DESCRIPTION

Described herein is a technology related to a semiconductor package that is installed in a portable device for data communications. More particularly, the semiconductor package that contains a memory, a digital logic chip, and an optical port in a single module or mold is described.

For example, large data or high bandwidth information is transmitted over a fiber optic cable that is plugged into the portable device. The fiber optic cable is directly connected to the optical port of the semiconductor package rather than through a standard input/output port coupled to a mother board of the portable device. The mother board may contain different components and interfaces of the portable device, such as memory separately located from the digital logic chip, a jumper connector, a heat sink, voltage regulators, amplifiers, and the like. In other words, this circuitry configuration of the mother board may not be able to comply with data rate that may be required of the memory and the digital logic chip in case of large data or high bandwidth communication in the above example.

As an example of present implementation herein, an electro-optical coupler may provide connections between the memory, the digital logic chip and the optical port. Since the memory and the digital logic chip are configured to operate via electrical signals, a photo detector may be integrated in the single module (i.e., semiconductor package) to convert light signals to electrical signals. Similarly, a laser diode may be integrated and utilized to convert the electrical signal into the light signals. In an implementation, the photo detector and the laser diode may be integrated into the memory or the digital logic chip itself, or at a joining point between the electro-optical coupler and the memory or the digital logic chip. Furthermore, a lens is positioned at a rear end of the optical port to provide continuity in the light signals between a connecting fiber optic cable and the electro-optical coupler. The light signals may contain modulated light signals for data communications.

As an example of present implementation herein, a conductive wiring (i.e., copper surface) of a printed circuit board (PCB) may provide connections between the memory, the digital logic chip and the optical port. In this example, the photo detector and the laser diode may be integrated at a rear end of the optical port that couples the connecting fiber optic cable to the conductive wiring of the PCB.

As an example of present implementation herein, the connecting fiber optic cable is terminated by a proprietary connector that is configured to mate with the optical port. In this example, the optical port is configured to include a center that aligns with the center of the connecting fiber optic cable.

Figure 1:
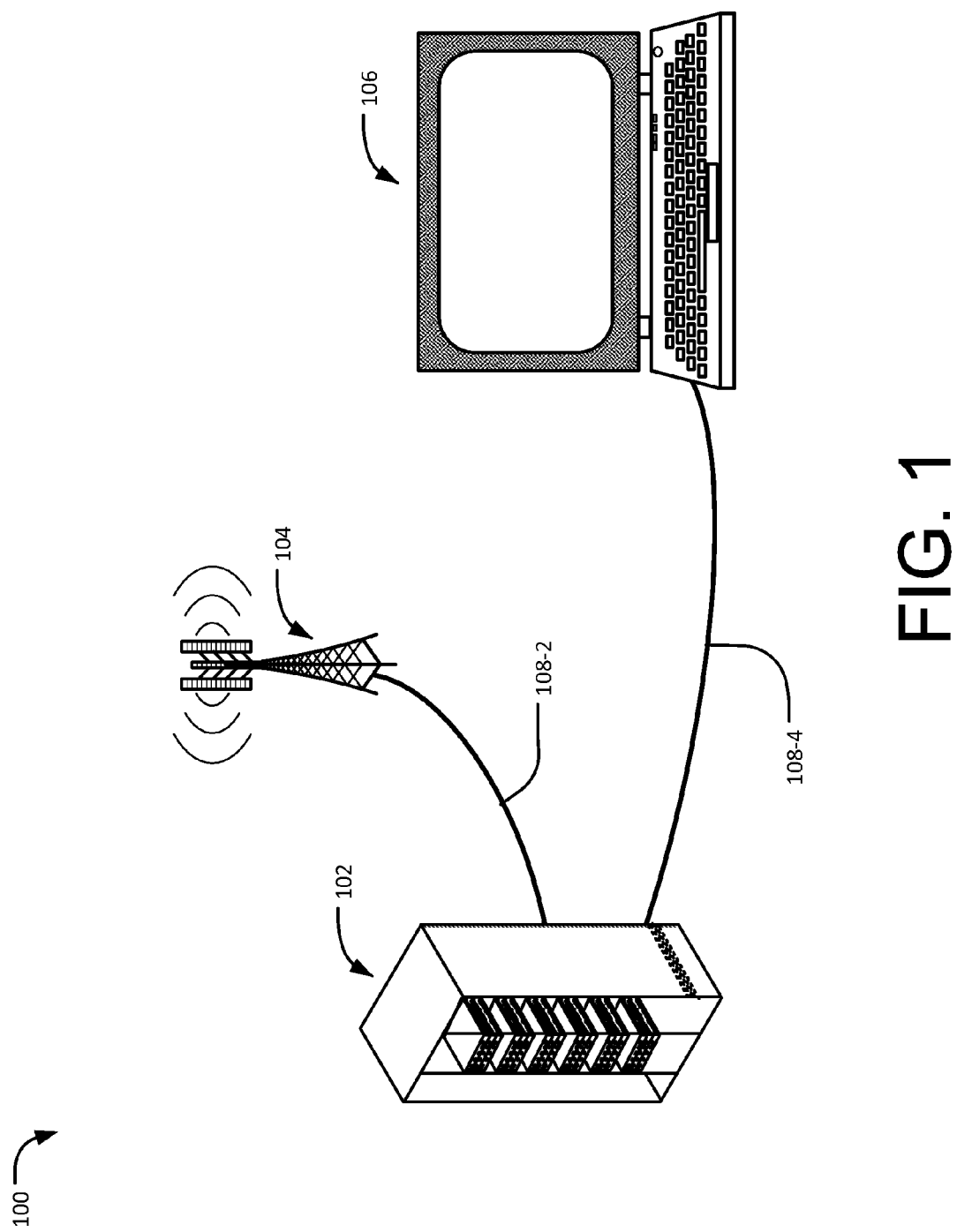
FIG. 1 illustrates an example scenario that shows an example application of a semiconductor package in data communications.

FIG. 1 illustrates a scenario 100 that shows an example application of a semiconductor package in data communications. For purposes of illustration, system 100 shows a server 102 connected to an antenna 104 and a laptop 106. Furthermore, system 100 shows a fiber optic cable 108 that links the server 102 to the antenna 104 at one end, and the server 102 to the laptop 106 at another end.

As an example of present implementation herein, the server 102 may transmit large amount of data or high bandwidth information to the antenna 104 or to the portable device 106. This transmission is implemented by sending pulses of light signals through the fiber optic cables 108-2 and 108-4. For example, the light signals form an electromagnetic carrier wave modulated to carry the large data or high bandwidth information from the server 102 to the antenna 104 or to the portable device 106. In this example, the antenna 104 or the portable device 106 is configured to process the large data or high bandwidth information using a semiconductor package (not shown) in its system.

As an example of the present implementation herein, the semiconductor package is a single module that links directly to the fiber optic cable 108. In other words, rather than using a separate input/output port (not shown) in a typical antenna module (not shown) of the antenna 104 or the portable device 106, the fiber optic cable 108 is directly connected to the single module itself through an optical port (not shown). For example, the single module contains memory chips (not shown), digital logic chips (not shown) and the optical port.

As an example of present implementation herein, the portable device 106 includes (but is not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, or the like. On the other hand, the server 102 may store computer programs to provide database services to the portable device 106, to the antenna module of the antenna 104, and the like.

FIG. 2a illustrates a semiconductor package 200 with a disconnected fiber optic cable. As shown, the semiconductor package 200 contains an optical port 202 that is configured to mate with a connector 204 of the fiber optic cable 108.

As an example of current implementations herein, the semiconductor package 200 contains the memory chips and the digital logic chips that are interconnected using an electro-optical couplers (not shown) or though conductive wirings of a PCB (not shown).

When the semiconductor package 200 utilizes the electro-optical couplers, the optical port 202 may include a lens (not shown) to guide the modulated light signals to or from the semiconductor package 200. For example, modulated light signals from the fiber optic cable 108 are received and processed by the semiconductor package 200 with minimal losses in between the fiber optic cable 108 and the electro-optical couplers.

When the semiconductor package 200 utilizes the conductive wirings of the PCB, such as during the receiving of the modulated light signals from the fiber optic cable 108, the optical port 202 is configured to include a photo detector (not shown) to convert the received modulated light signals into electrical signals. The electrical signals may then flow through the conductive wirings and received by the digital logic chips for further processing.

Similarly, when the conductive wirings of the PCB is utilized during transmission of modulated light signals from the semiconductor package 200, the optical port 202 is configured to include a laser diode (not shown) to convert the electrical signals into light signals. The light signals may then flow through the fiber optic cable 108 going to its respective destination (e.g., server 102).

As an example of present implementation herein, the connector 204 is configured to link or bond directly the fiber optic cable 108 to the semiconductor package 200. The connector 204 may be configured as a standard connector or a proprietary connector. When configured as a standard connector, the connector 204 is built and designed to be industry standard in connecting with the semiconductor package 200. In other words, the connector 204 may include a standard optical port 202 as compared to a specially designed optical port 202 when configured as a proprietary connector. In an implementation, a typical mating mechanism for the connector 204 may be push and click, turn and latch (bayonet), or screw-in (threaded).

As an example of present implementation herein, the connector 204 is installed by preparing a fiber optic cable end and inserting it into the rear of the connector body. For example, a quick-set adhesive is utilized to hold the fiber optic cable 108 securely, and a strain relief is secured to the rear. Once the adhesive sets, the fiber optic cable's end may be polished to a mirror finish. Different polish profiles may be used, depending on the type of the fiber optic cable 108 and the application. For example, in a single-mode fiber, the fiber optic cable 108 ends are polished with a slight curvature that makes the mated connector 204 and the optical port 202 touch only at their cores. In another implementation, a lens may be utilized to reduce back reflection or losses due to the light signals that reflect from a leak due to gap loss. In this example, the lens may be configured to be adjustable or accurately positioned with respect to the fiber optic cable 108.

FIG. 2b illustrates the semiconductor package 200 with the connected fiber optic cable 108. For example, the connector 204 is pushed and clicked into the optical port 202. In this example, the optical port 202 is configured to include a wide aperture entrance that narrows towards a rear end (not shown) of the optical port 202 in order to engage and align the connecting fiber optic cable 108 directly to the rear end of the optical port 202.

FIG. 3a illustrates an example implementation of the semiconductor package 200 that utilizes the electro-optical coupler to interconnect components within the single module. FIG. 3a shows the semiconductor package 200 that contains memory chips 300, an electro-optical coupler 302, a digital logic chip 304, and a lens 306 at a rear end of the optical port 202.

As an example of current implementations herein, the memory chips 300, digital logic chip 304, the coupling electro-optical coupler 302, and the optical port 202 are fabricated in a single mold. For example, memory chips 300-2, 300-4, and 300-6 are interconnected by the electro-optical coupler 302 that contains a waveguide to reflect light signals to flow through. Furthermore, the memory chips 300 are coupled to the digital logic chip 304 through the electro-optical coupler 302. Since the memory chips 300 and the digital logic chip 304 are processing electrical signals within their own system during data communications, a photo detector or a laser diode may be directly installed—at the memory chips 300 and the digital logic chip 304—in order to convert light signals into electrical signals, or to convert the electrical signals into light signals, respectively.

As an example of current implementations herein, the lens 306 is configured to align the light signals going to or coming from the semiconductor package 200. For example, when receiving modulated light signals from the fiber optic cable 108, the lens 306 may provide continuity in the received modulated light signals in order to avoid leakage or signal losses that may distort the data communications. In this example, the optical port 202 is configured to include a center that is aligned with the center of the fiber optic cable 108. The fiber optic cable 108 may be a single mode or multi-mode connecting fiber optic cable.

FIG. 3b illustrates another implementation of the semiconductor package 200 that utilizes the conductive wirings of the PCB to interconnect components within the single module. As shown, the semiconductor package 200 utilizes a conductive wiring 308 of a PCB 310, a photo detector 312, and a laser diode 314 at the rear end of the optical port 202.

As an example of current implementation herein, the conductive wiring 308 interconnects the memory chips 300 and the digital logic chip 304. Furthermore, the conductive wiring 308 links the memory chips 300 and the digital logic chip 304 to the fiber optic cable 108 through the optical port 202. In an implementation, the photo detector 312 and the laser diode 314 are configured to be positioned at the rear end of the optical port 202 to support transformation of light signals into electrical signals and vice versa. For example, the photo detector 312 generates an equivalent electrical current that corresponds to an amount of received light signal energy from the fiber optic cable 108. This equivalent electrical current is then supplied to the digital logic chip 304 for further processing, or to the memory chip 300 for storage. Similarly, the laser diode 314 may provide the light signal energy that corresponds to the electrical current that may be generated by the digital logic chip 304 or the memory chip 300.

Figure 4:
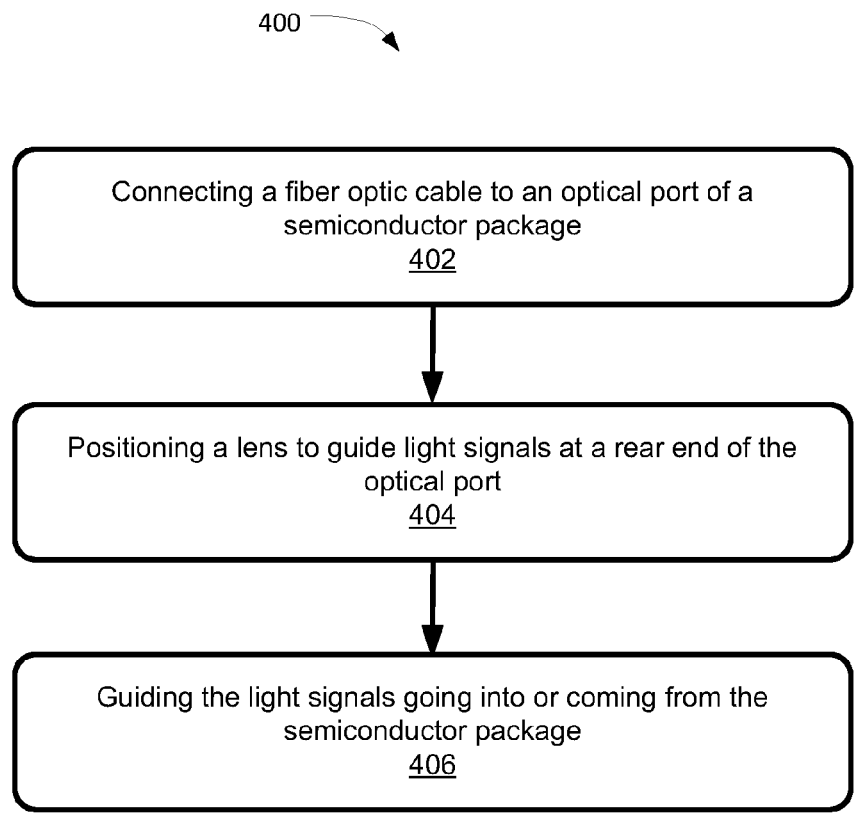
FIG. 4 illustrates an example flowchart of an example method of implementing data communication through a semiconductor package that contains an electro-optical coupler to interconnect a memory, a digital logic chip, and an optical port.

FIG. 4 shows an example process flowchart 400 illustrating an example method of implementing data communication through a semiconductor package that contains electro-optical couplers to interconnect a memory, a digital logic chip, and an optical port. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402, connecting a fiber optic cable to an optical port of a semiconductor package is performed. For example, the fiber optic cable (e.g., fiber optic cable 108) is connected directly to the optical port (e.g., optical port 202) of a semiconductor package (e.g., semiconductor package 200) in order to directly facilitate large data or high bandwidth communications through the fiber optic cable 108.

As an example of present implementation herein, the semiconductor package 200 is a single module that contains a memory (e.g., memory chip 300) that is coupled to a digital logic chip (e.g., digital logic chip 304). In this example, the optical port 202 is configured to link the memory chip 300 and/or the digital logic chip 304 to the fiber optic cable 108

At block 404, positioning a lens to guide light signals at a rear end of the optical port is performed. For example, the optical port 202 is configured to contain the lens (e.g., lens 306) in order to facilitate light signal reflections between an electro-optical coupler (e.g., electro-optical coupler 302) and the fiber optic cable 108. In this example, the electro-optical coupler 302 couples the memory chip 300 and/or the digital logic chip 304 to the optical port 202.

At block 406, guiding the light signals going into or coming from the semiconductor package is performed.

Figure 5:
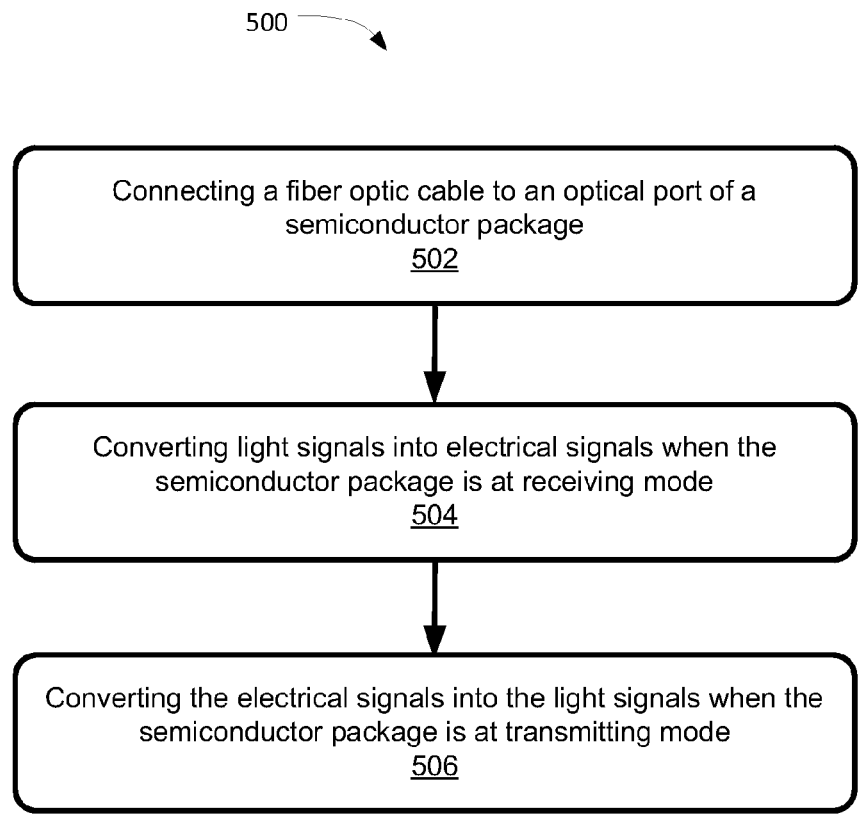
FIG. 5 illustrates an example flowchart of an example method of implementing data communication through a semiconductor package that utilizes conductive wirings in a printed circuit board (PCB) to interconnect a memory, a digital logic chip, and an optical port.

FIG. 5 shows an example process flowchart 500 illustrating an example method of implementing data communication through a semiconductor package that utilizes conductive wirings in a PCB to interconnect a memory, a digital logic chip, and an optical port. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, connecting a fiber optic cable to an optical port of a semiconductor package is performed. For example, the fiber optic cable 108 is connected directly to the optical port 202 of the semiconductor package 200. In this example, the semiconductor package 200 utilizes conductive wirings (e.g., conductive wiring 308) of a PCB (e.g., PCB 310) to couple the memory chip 300 and/or the digital logic chip 304 to the optical port 202. The optical port 202 may be configured to receive light signals from the fiber optic cable 108, or the optical port 202 may be configured to transmit electrical signal by first converting it to light signals before directing the light signals to the fiber optic cable 108.

At block 504, converting light signals into electrical signals when the semiconductor package is at receiving mode is performed. Since the conductive wiring 308 is utilized to couple the optical port 202 to the memory chip 300 and/or digital logic chip 304, the received light signals from the fiber optic cable 108—during the receiving mode—are converted into electrical signals. The electrical signals flow through the conductive wiring 308 and are received by the digital logic chip 304 for further processing or they are received by the memory chip 300 for storage.

As an example of present implementation herein, a photo detector (e.g., photo detector 312) is utilized to convert the received light signals into electrical signals. The photo detector 312 may be built at the rear end of the optical port 202. For example, the rear end is where the conductive wiring 308 and the optical port 202 is linked or connected.

In an implementation, the optical port 202 is built to contain a wide aperture entrance that gradually narrows towards the rear end where the photo detector 312 is located. Furthermore, a latch at the rear end of the optical port 202 is utilized to fasten and/or fit the fiber optic cable 108 to the optical port 202.

At block 506, converting the electrical signals into the light signals when the semiconductor package is at transmitting mode is performed. For example, a laser diode (e.g., laser 314) is utilized to convert the electrical signals into light signals during the transmitting mode in the semiconductor package 200. In this example, the electrical signals may be provided by the digital logic chip 304 and/or the memory chip 300.

What is claimed is:

1. A semiconductor package comprising:
   a digital logic chip;
   a memory coupled to the digital logic chip;
   an optical port that further comprises a lens which is disposed at a rear-end of the optical port, wherein the lens is configured to receive and align light signals; and
   an electro-optical coupler that couples the optical port to the digital logic chip and the memory, wherein the electro-optical coupler receives the aligned light signals through the lens of the optical coupler, wherein the digital logic chip, memory, optical port, and the electro-optical coupler form a single module.

2. The semiconductor package as recited in claim 1, wherein the memory is coupled to the digital logic chip through a conductive wiring of a printed circuit board (PCB), the conductive wiring configured to carry electrical signals between the digital logic chip and the memory.

3. The semiconductor package as recited in claim 1, wherein the optical port includes a latching feature to engage and align a connecting fiber optic cable directly to the rear end of the optical port.

4. The semiconductor package as recited in claim 1, wherein the optical port is configured for one of a single mode or multi-mode connecting fiber optic cable.

5. The semiconductor package as recited in claim 1, wherein the semiconductor package is constructed in a single mold.

6. The semiconductor package as recited in claim 1, wherein the electro-optical coupler is utilized to couple the digital logic chip to the memory.

7. The semiconductor package as recited in claim 1 further comprising a photo detector at the rear end of the optical port to convert the received light signals into electrical signals, the electrical signals flow through a conductive wiring of a printed circuit board (PCB) that couples the optical port to the digital logic chip or the memory.

8. The semiconductor package as recited in claim 1 further comprising a laser diode at the rear end of the optical port to convert electrical signals into the light signals during data transmission, the electrical signals flow through a conductive wiring of a printed circuit board (PCB) that couples the digital logic chip or the memory to the optical port.

9. A device comprising:
a fiber optic cable; and
a semiconductor package that is configured to include a single module, the single module further includes:
a memory that is coupled to a digital logic chip;
an optical port that comprises a lens which is disposed at a rear-end of the optical port, wherein the lens is configured to receive and align light signals from the fiber optic cable; and
an electro-optical coupler that is configured to link the optical port to the memory and the digital logic chip, wherein the electro-optical coupler receives the light signals through the lens of the optical coupler.

10. The device as recited in claim 9, wherein the fiber optic cable is terminated by a connector that is configured to align a center of the fiber optic cable to the center of the optical port.

11. The device as recited in claim 9, wherein the memory is coupled to the digital logic chip through a conductive wiring of a printed circuit board (PCB), the conductive wiring carries electrical signals between the digital logic chip and the memory.

12. The device as recited in claim 9, wherein the optical port is configured to include a latching feature to engage the fiber optic cable directly to the rear end of the optical port.

13. The device as recited in claim 9, wherein the electro-optical coupler is utilized to couple the digital logic chip to the memory.

14. The device as recited in claim 9 further comprising a photo detector at the rear end of the optical port to convert the received light signals into electrical signals, the electrical signals flow through a conductive wiring of a printed circuit board (PCB) that couples the optical port to the digital logic chip or the memory.

15. The device as recited in claim 9 further comprising a laser diode at the rear end of the optical port to convert electrical signals into light signals during data transmission, the electrical signals flow through a conductive wiring of a printed circuit board (PCB) that couples the digital logic chip or the memory to the optical port.

16. A method of implementing data communication in a semiconductor package, the method comprising:

connecting a fiber optic cable to an optical port of the semiconductor package;
receiving and aligning light signals from the fiber optic cable, wherein the receiving and aligning is performed by a lens that is disposed at a rear-end of the optical port; and
guiding the received aligned light signals from the optical port to a digital logic chip and a memory through an electro optical coupler, wherein the electro-optical coupler receives the aligned light signals through the lens of the optical coupler.

17. The method as recited in claim 16, wherein the coupling of the memory to the digital logic chip utilizes a conductive wiring of a printed circuit board (PCB), the conductive wiring carries electrical signals between the digital logic chip and the memory.

18. The method as recited in claim 16, wherein the optical port includes a center that aligns with the center of the fiber optic cable.

19. The method as recited in claim 16, wherein the optical port includes a latching feature to engage the fiber optic cable directly to the rear end of the optical port.

20. The method as recited in claim 16, wherein the optical port is configured for a single mode or multi-mode connecting fiber optic cable.

21. The method as recited in claim 16, wherein the electro-optical coupler is utilized to couple the digital logic chip to the memory.

22. The method as recited in claim 16, wherein the optical port includes a photo detector at the rear end of the optical port to convert the received light signals into electrical signals, the electrical signals flow through a conductive wiring of a printed circuit board (PCB) that couples the optical port to the digital logic chip or the memory.

23. The method as recited in claim 16, wherein the optical port includes a laser diode at the rear end of the optical port to convert electrical signals into the light signals during data transmission, the electrical signals flow through a conductive wiring of a printed circuit board (PCB) that couples the digital logic chip or the memory to the optical port.

* * * * *